US010330079B2

(12) United States Patent
Mohajer

(10) Patent No.: US 10,330,079 B2
(45) Date of Patent: *Jun. 25, 2019

(54) TURBINE WITH DYNAMICALLY ADAPTABLE SAVONIUS BLADES

(71) Applicant: Hassan Mohajer, Novato, CA (US)

(72) Inventor: Hassan Mohajer, Novato, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/604,471

(22) Filed: May 24, 2017

(65) Prior Publication Data

US 2017/0260965 A1 Sep. 14, 2017

Related U.S. Application Data

(63) Continuation of application No. 14/533,868, filed on Nov. 5, 2014, now Pat. No. 9,683,549.

(51) Int. Cl.
*F03D 3/06* (2006.01)
*F03D 3/00* (2006.01)
*F03D 3/02* (2006.01)

(52) U.S. Cl.
CPC ............ *F03D 3/068* (2013.01); *F03D 3/002* (2013.01); *F03D 3/007* (2013.01); *F03D 3/02* (2013.01); *F03D 3/062* (2013.01); *F05B 2240/31* (2013.01); *F05B 2240/311* (2013.01); *F05B 2240/921* (2013.01); *Y02E 10/74* (2013.01)

(58) Field of Classification Search
CPC ... F03D 3/00; F03D 3/002; F03D 3/06; F03D 3/061; F03D 3/062; F03D 3/064; F03D 3/067; F03D 3/068
See application file for complete search history.

(56) References Cited

U.S. PATENT DOCUMENTS

| 1,856,578 | A | 5/1932 | Miguel et al. |
| 4,659,940 | A | 4/1987 | Shepard |
| 6,327,994 | B1 | 12/2001 | Labrador |
| 7,129,596 | B2 | 10/2006 | Macedo |
| 7,335,000 | B2 | 2/2008 | Ferguson |

(Continued)

FOREIGN PATENT DOCUMENTS

| WO | WO 99/13221 A1 | 3/1999 |
| WO | WO 2007/139412 A1 | 12/2007 |
| WO | WO 2014/147423 A1 | 9/2014 |

OTHER PUBLICATIONS

European Supplemental Search Report dated Jul. 4, 2018 regarding European Patent Application No. 15857919.3 corresponding to U.S. Appl. No. 15/604,471 (5 pages).

*Primary Examiner* — Igor Kershteyn
*Assistant Examiner* — John S Hunter, Jr.
(74) *Attorney, Agent, or Firm* — Lewis Roca Rothgerber Christie LLP

(57) ABSTRACT

An apparatus with rotating turbine including: a cage rotating around a cage axis, wherein the rotation of the cage around the cage axis induces a lift of the apparatus above the ground; and a plurality of turbines located within the cage, each turbine rotating around a respective turbine axis different from the cage axis, and including a turbine blade having an adaptable shape; a frame including a first frame portion and a second frame portion coupled to the first frame portion, and wherein the first frame portion pivots relative to the second frame portion; a connection between an end of the frame and a region of the frame away from the end of the frame.

18 Claims, 11 Drawing Sheets

(56) References Cited

U.S. PATENT DOCUMENTS

| | | | |
|---|---|---|---|
| 9,120,554 B2* | 9/2015 | Shome | B64C 3/48 |
| 2008/0296905 A1 | 12/2008 | Ferguson | |
| 2011/0081243 A1 | 4/2011 | Sullivan | |
| 2013/0043354 A1* | 2/2013 | Shome | B64C 3/48 244/219 |

* cited by examiner

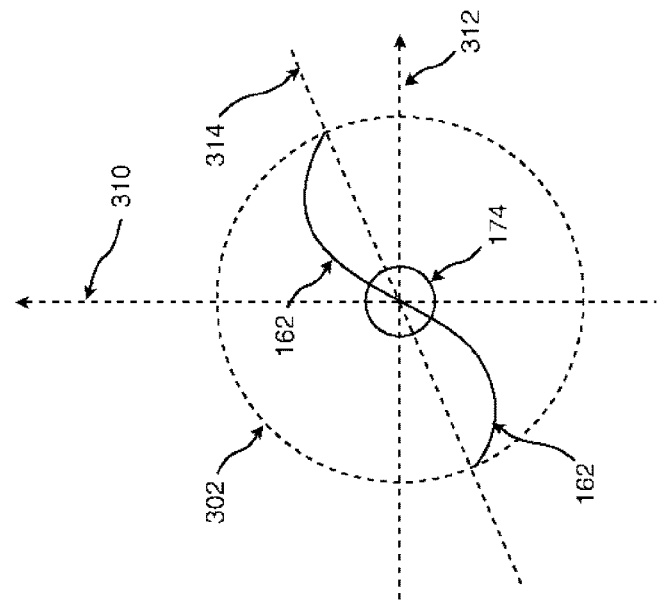
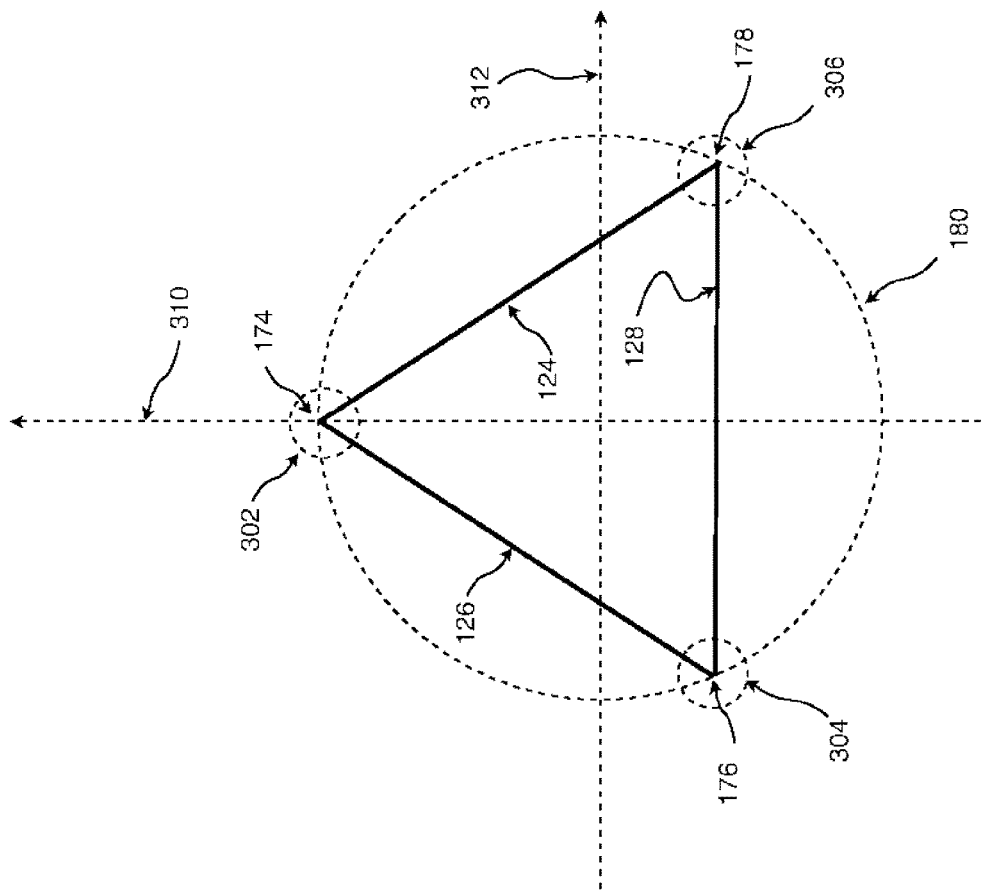
FIG. 3B
FIG. 3A

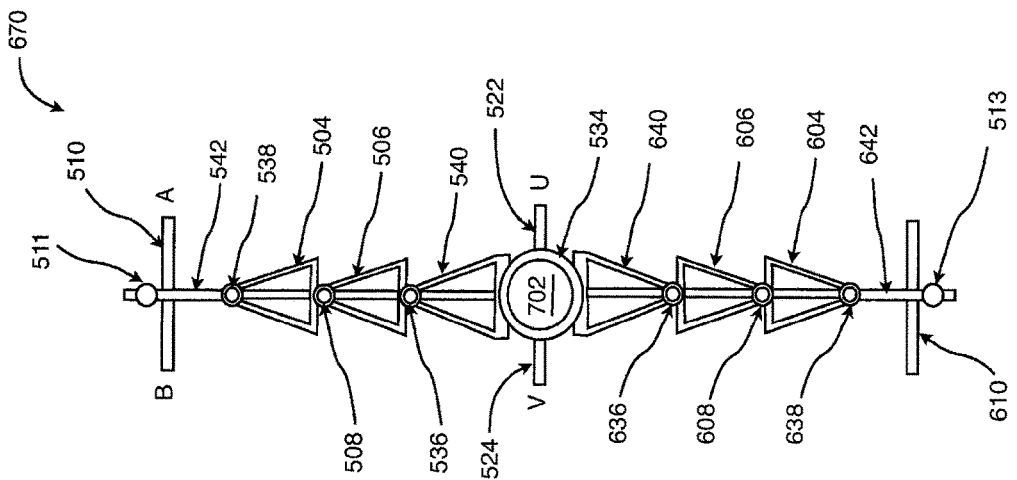

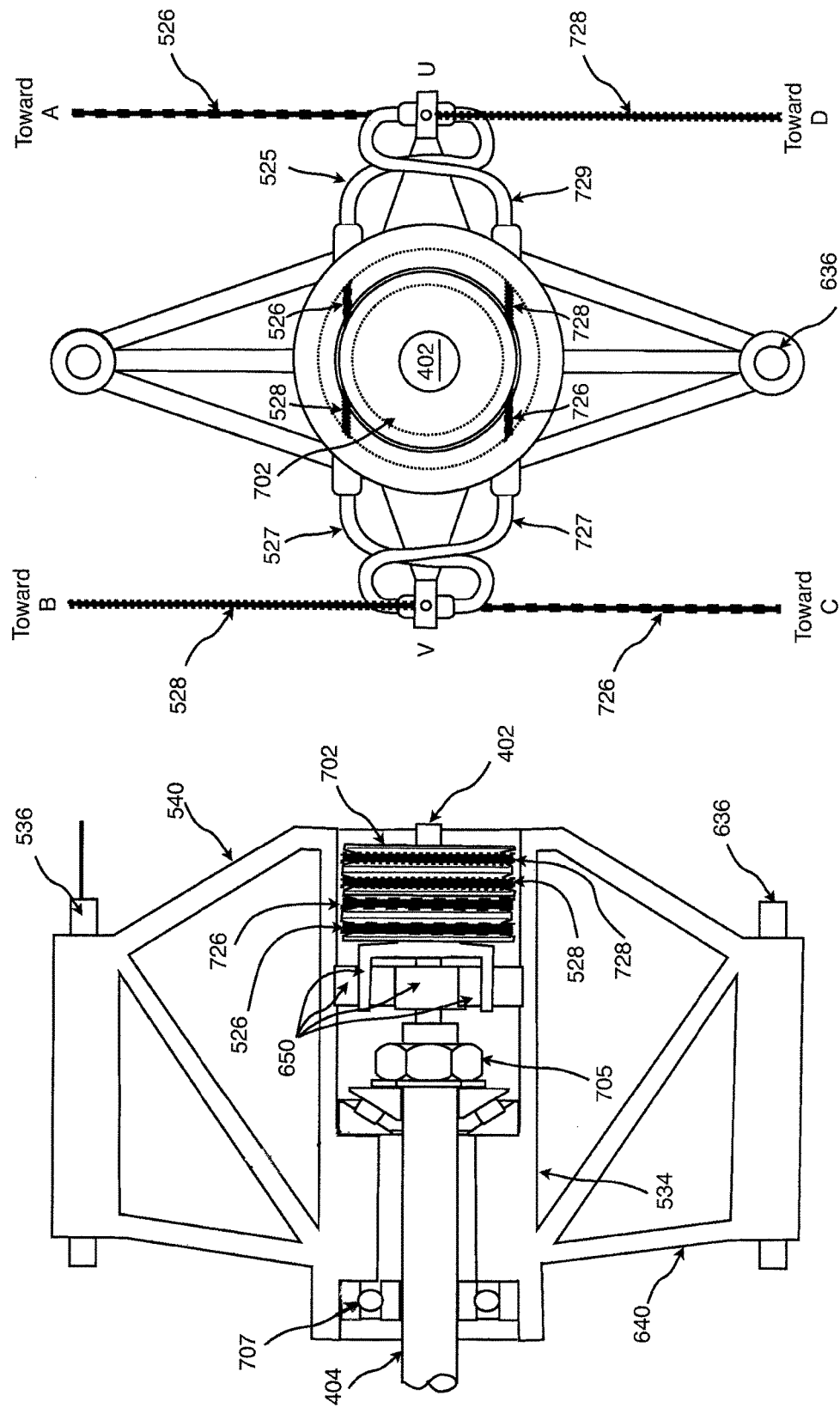

TURBINE WITH DYNAMICALLY ADAPTABLE SAVONIUS BLADES

CROSS-REFERENCE TO RELATED APPLICATION(S)

The present application is a continuation of U.S. application Ser. No. 14/533,868, filed Nov. 5, 2014, the entirety of which is hereby expressly incorporated by reference herein.

FIELD

The present disclosure relates generally to a machine and, more particularly, to a turbine with dynamically adaptable Savonius blades.

BACKGROUND

A turbine may use wind to turn a shaft. The turning shaft has kinetic energy. The kinetic energy of the turning shaft may be converted to electrical power. Existing turbines may include blades. However, such blades typically have fixed shapes. The shape of the blades of a turbine can substantially affect the effectiveness of the turbine. Wind conditions (e.g., speed, velocity, acceleration, etc.) can vary from time to time. Blades that are fixed in shape may inhibit the turbine from performing effectively under varying wind conditions. Accordingly, existing designs of turbines may benefit from improvements that overcome such limitations.

SUMMARY

Various features described herein may be embodied in various apparatuses. Non-limiting examples of such apparatuses may include various machines (e.g., a Savonius machine), various turbines, and any apparatus configured to use wind to generate kinetic energy. Although the term "apparatus" or "apparatuses" may be used herein, such a term shall not limit the scope of the present disclosure.

An apparatus may include at least a cage configured to rotate around a cage axis, and a Savonius turbine located at an end of the cage. The turbine may be configured to rotate around a turbine axis. The turbine axis may be different from the cage axis. The turbine may include a turbine blade having an adaptable shape. The turbine blade may include a frame. The frame may include a first frame portion and a second frame portion coupled to the first frame portion. The first frame portion may be configured to pivot relative to the second frame portion.

The apparatus may include a first connection between a first side of an end of the frame and a center region of the frame. The apparatus may also include a second connection between a second side of the first end of the frame and the center region of the frame. The apparatus may also include a turbine controller. The turbine controller may be configured to at least maintain, shorten, or lengthen at least the first connection or the second connection.

The first frame portion may be configured to pivot relative to the second frame portion when at least the first connection or the second connection is at least shortened or lengthened. The adaptable shape of the turbine blade may include a flat shape when a length of the first connection is similar to a length of the second connection. The adaptable shape of the turbine blade may include a curvature when a length of the first connection is different from a length of the second connection. The turbine controller may be configured to control the curvature of the turbine blade by shortening the first connection while concurrently lengthening the second connection or by shortening the second connection while concurrently lengthening the first connection.

The apparatus may include a cage controller configured to control the rotation of the cage around the cage axis. The cage controller may be configured to control the rotation of the cage based on at least a speed, a direction, a velocity, or an acceleration of wind. The turbine controller may be configured to control the rotation of the turbine based on the location of the turbine on a rotational path of the cage. The turbine controller may be configured to control the rotation of the turbine based on at least the speed, the direction, the velocity, the acceleration of the wind, a rotational speed of the cage, a location of the turbine blade relative to the turbine axis, or a location of the turbine on a circular path around the cage axis The cage controller may be configured to control the rotation of the cage based on a mode of the apparatus. The turbine controller may be configured to control the rotation of the turbine based on the mode of the apparatus. When the apparatus is in a mode, the cage controller may be configured to inhibit the rotation of the cage around the cage axis, and the turbine controller may be configured to allow the rotation of the turbine around the turbine axis. When the apparatus is in a mode, the cage controller may be configured to allow the rotation of the cage around the cage axis, and the turbine controller may be configured to allow the rotation of the turbine around the turbine axis. The apparatus may be a Savonius turbine. Blades of the Savonius turbine may extend more horizontally than vertically relative to ground. The rotation of the cage around the cage axis and/or the rotation of the turbine around the turbine axis may induce a Magnus effect. The Magnus effect may lift the apparatus above the ground. The apparatus may include a plurality of cages in various directions that may differ relative to each other and/or with various angles that may differ relative to each other. A number of the plurality of cages may be based on the lift needed to lift the apparatus and/or a load above ground. The apparatus may include a plurality of turbines. A number of the plurality of turbines may be based on the lift needed to lift the apparatus and/or the apparatus and a load above ground. A number of the plurality of turbines may be based on various dimensions (e.g., the size, such as the length, the width, the height, etc.) of one or more of the cages.

The apparatus may include a seat and user controls near the seat. The user controls may be configured for use by a user seated on the seat. The user controls may be configured to control at least the cage controller or the turbine controller. The apparatus may be configured to be connected to a motor. The motor may be configured to convert kinetic energy from the rotation of the cage around the cage axis to electric energy. The motor may be configured to convert kinetic energy from the rotation of the turbine around the turbine axis to electric energy.

The apparatus may be configured to hold a load. A load may be carried or hanged from the belt holders, the cage axis, or both the belt holders and the cage axis.

In addition to user controls, the apparatus may have manual steering. Such manual steering may be related certain mechanisms implemented in paragliders. Such manual steering mechanisms may enable the user to land the apparatus safely should the control and/or power system fail during flight.

Each arm that connects to a motor of the Savonius blades may be supported by two of the cage belt portions, two cables that connect an arm to the other two arms and/or the tension cables/strips.

The foregoing is merely a summary of various features described in greater detail herein. Additional features are also described herein. The embodiments described herein may be implemented in any combination or sub-combination, even if not explicitly described herein.

BRIEF DESCRIPTION OF DRAWINGS

FIGS. 3A-3B are diagrams illustrating side views of various portions of an apparatus according to various embodiments of the present disclosure.

FIGS. 6A-6C are diagrams illustrating various cross-sectional views of various portions of an example turbine of an apparatus according to various embodiments of the present disclosure.

FIGS. 7A-7B are diagrams illustrating various cross-sectional views of various portions of an example of blade controllers of an apparatus according to various embodiments of the present disclosure.

DETAILED DESCRIPTION

Provided herein is a description of various embodiments of various features. However, the description provided herein is not intended to limit the scope of the present disclosure. One of ordinary skill in the art will appreciate that the features described herein may be embodied in additional and/or alternative embodiments without deviating from the scope of the present disclosure.

Figure 1A:
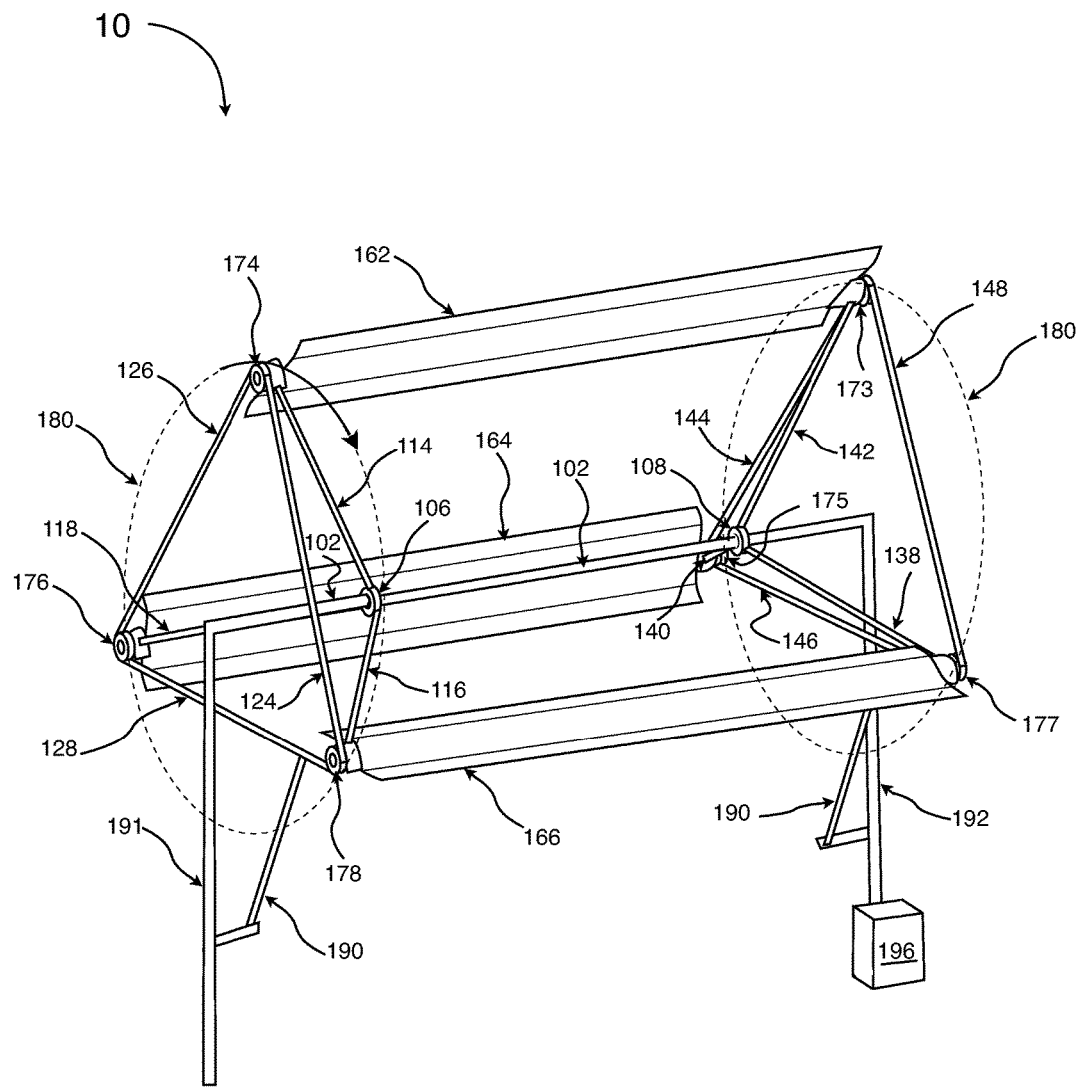
FIG. 1A is a diagram illustrating a side perspective view of a single-cage apparatus.

FIG. 1A is a diagram illustrating an example of an apparatus 10 according to various embodiments of the present disclosure. The cage itself is a kind of turbine when the direction of its blades are controlled and harmonized. The blades of this turbine are adaptable in shape such that the shape of the blade may vary from a Savonius blade to a flat blade and possibly to a Savonius blade of an opposite direction, shape, configuration and/or orientation.

The apparatus 10 illustrated in FIG. 1A is a cage that rotates around the cage axis 102. The cage may include at least one Savonius turbine/blade. For example, the cage rotating around cage axis 102 includes turbines 162, 164, 166. Although three turbines are illustrated for the cage in the example apparatus 10 shown in FIG. 1, one of ordinary skill will understand that the scope of the present disclosure is not limited by the number of turbine illustrated in FIG. 1. For example, the apparatus 10 may include a greater number or a fewer number of Savonius turbines/blades for the cage without deviating from the scope of the present disclosure.

The turbines/blades may be located at an end of the cage. For example, turbines 162, 164, 166 are supported by arms 114, 118, 116, on one side and by arms 142, 140, 138, on the other side, respectively, which extend from the cage axis 102. As such, the turbines 162, 164, 166 are located at the end of the cage rotating around the cage axis 102.

The cage axis 102 may include a connection point to which the arm supporting the turbines is connected. For example, the connection point 106 is connected to the arms 114, 116, 118, which support turbines 162, 166, 164, respectively. As another example, the connection point 108 is connected to arms 138, 140, 142, which support turbines 166, 164, 162, respectively.

A turbine/blade may rotate around its own turbine axis. The turbine axis may be different from the cage axis. For example, the turbine axis around which turbine 162 rotates is different from the cage axis 102 around which the corresponding cage rotates. The turbine may include a turbine blade, and the turbine blade may be adaptable in shape. Additional details regarding the adaptable shape of the turbine blade is provided below, inter alia, with reference to FIG. 5.

A turbine may be connected to another turbine by a belt. The belt may be involved with the rotation of the cage around the respective cage axis. As such, the belt may also be referred to as a cage belt. For example, the belt portion 124, 126, 128 and 144, 146, 148 may be involved with the rotation of the cage around the cage axis 102. Belt holders 190 may include an elastic material that may be connected to a portion of the belt and/or a leg 191, 192 of the apparatus 10.

The belt may contact an end region of the turbine. For example, turbines 162, 164, 166 may have end regions 174, 176, 178, on one side, and 173, 175, 177 on the other side, respectively. Each belt portion 124, 126, 128, 144, 146, 148 may make contact with two of the end regions 174, 176, 178, 173, 175, 177 of the turbines 162, 164, 166. The end regions 174, 176, 178, 173, 175, 177, may include electric motors and/or electric generators, which will be described in greater detail below, inter alia, with reference to FIG. 4.

The apparatus 10 may include a cage controller. The cage controller may include software components (e.g., non-transitory computer readable medium), hardware components (e.g., circuits, memory, power, etc.), mechanical components (e.g., levers, motors, hinges, etc.), and any combination of one or more of the foregoing components. The cage controller may be configured to control the rotation of the cage around the cage axis. The cage controller may be configured to control the rotation of the cage based on at least a speed, a direction, a velocity, or an acceleration of wind and a load (e.g., a weight, a person, an object, etc. that is not otherwise part of the apparatus). The apparatus may include one or more turbine/blade controllers. The turbine controller may include software components (e.g., non-transitory computer readable medium), hardware components (e.g., circuits, memory, power, etc.), mechanical components (e.g., levers, motors, hinges, etc.), and any combination of one or more of the foregoing components. The turbine controller(s) may control one or more turbines. The turbine controller may be configured to control the rotation of the turbine/blade based on at least the speed, the direction, the velocity, or the acceleration of wind and the location of the turbine/blade on the rotational path 180 of the cage.

The cage controller and/or turbine controller(s) may be located in various locations of the apparatus 10 without deviating from the scope of the present disclosure. For example, the cage controller and/or turbine controller(s) may be located at or near the user controls of the user. One of ordinary skill in the art will understand that the cage controller and/or turbine controller(s) may additionally and/or alternatively be located at any other location of the apparatus 10.

The cage controller may be configured to control the rotation of the cage based on a mode of the apparatus 10. The turbine controller may be configured to control the rotation of the turbine based on the mode of the apparatus 10. The apparatus 10 may operate in various modes without deviating from the scope of the present disclosure. An example of a mode is a 'first turbine mode.' One of ordinary skill in the art understands that 'first turbine mode' is a descriptive phrase, and such a mode may be referred to by any other term and/or name without deviating from the scope of the present disclosure. When the apparatus 10 is in such a mode, the cage controller may be configured to inhibit the rotation of the cage around the cage axis, and the turbine controller may be configured to allow the rotation of the turbine around the turbine axis. For example, the cage controller may be configured to inhibit the rotation of the cage around the cage axis 102, and the turbine controller may be configured to allow the rotation of one or more of the turbines 162, 164, 166 around their respective turbine axis. One of ordinary skill in the art understands that a mode may require more than one cage (e.g., two or more cages). In such a mode, the lock 414 may be active and inhibit the cage to rotate about its axis 102, the clutch 412 may disconnect the gearbox 416 from the motor 410, the clutch 408 may connect the gearbox 406 to the motor 410, and the motor 410 may rotate utilizing the power of the wind 206, which may be harvested by the respective Savonius blade and transferred to the turbine shaft 404 and to the gearbox 406.

Another example of a mode is a 'second turbine mode.' One of ordinary skill in the art understands that 'second turbine mode' is a descriptive phrase, and such a mode may be referred to by any other term and/or name without deviating from the scope of the present disclosure. When the apparatus 10 is in such a mode, the cage controller may be configured to allow the rotation of the cage around the cage axis, and the turbine controller may be configured to allow the rotation of the turbine around the turbine axis in a controlled manner. For example, the cage controller may be configured to allow the rotation of the cage around the cage axis 102, and the turbine controller may be configured to control the movement of one or more of the turbines 162, 164, 166 around the respective turbine axis in a way to provide the optimum lifting force at all times. In such a mode, the lock 414 may be inactive, allowing the cage to rotate about its axis 102, the clutch 412 may connect its cage shaft 420 to the motor 410 via its respective gearbox 416, and the clutch 408 may disconnect the gearbox 406 from the motor 410. Also, the motor 410 may rotate utilizing the power of the wind 206, which may be harvested by the cage.

Another example of a mode is a 'hybrid mode.' One of ordinary skill in the art understands that 'hybrid mode' is a descriptive phrase, and such a mode may be referred to by any other term and/or name without deviating from the scope of the present disclosure. When the apparatus 10 is in such a mode, the cage controller may be configured to allow the rotation of the cage around the cage axis, and the turbine controller may be configured to allow the rotation of the turbine around the turbine axis. For example, the cage controller may be configured to allow the rotation of the cage around the cage axis 102, and the turbine controller may be configured to allow the rotation of one or more of the turbines 162, 164, 166 around the respective turbine axis. One of ordinary skill in the art understands that many alternative configurations and/or embodiments may exist in accordance with various methods for absorbing and/or harvesting wind energy and/or transporting a load based on at least wind conditions and/or size of the load. In such a mode, the lock 414 may be inactive, allowing the cage to rotate about its axis 102, the clutch 412 may connect its cage shaft 420 to the motor 410 via its respective gearbox 416, and the clutch 408 may disconnect the gearbox 406 from the motor 410. Also, the motor 410 may rotate by the power of the power generator/storage 196.

Yet another example of a mode is a 'glide mode'. One of ordinary skill in the art understands that 'glide mode' is a descriptive phrase, and such a mode may be referred to by any other term and/or name without deviating from the scope of the present disclosure. When the apparatus 10 is in such a mode, the cage controller may be configured to inhibit the rotation of the cage around the cage axis, and the turbine controller may be configured to inhibit the rotation of the turbine around the turbine axis. For example, the cage controller may be configured to inhibit the rotation of the cage around the cage axis 102, and the turbine controller may be configured to inhibit the rotation of one or more of the turbines 162, 164, 166 around the respective turbine axis, and the direction of Savonius blade may be controlled by the turbine shaft 404. In such a mode, the lock 414 is active, thereby inhibiting the cage from rotating about its axis 102, the clutch 412 disconnects its cage shaft 420 from motor 410, and the clutch 408 may connect the gearbox 406 to the motor 410. Also, the motor 410 may rotate by the power of power generator/storage 196. The movement direction of the turbine shaft 404 in this mode may be free from the direction of the rotation of the motor 410 and may be controlled by the turbine controller.

The rotation of a cage around its cage axis may induce a Magnus effect, and the Magnus effect may induce a lift of the apparatus above the ground. For example, the rotation of one or more of the cages around the cage axis 102, may induce a Magnus effect, which lifts the apparatus 10 above the ground and into the air. Additionally or alternatively, the rotation of a turbine/blade around its turbine axis may induce a Magnus effect, and the Magnus effect may induce a lift of the apparatus above the ground. For example, the rotation of one or more of the turbines 162, 164, 166, may induce a Magnus effect, which lifts the apparatus 10 above the ground.

The apparatus 10 may include an electric power generator/storage 196. Although the example apparatus 10 illustrated in FIG. 1A shows the power generator/storage 196 located on leg 192, one of ordinary skill in the art will understand that the power generator/storage 196 may be located in other portions of the apparatus 10, or even separate from the apparatus 10, without deviating from the scope of the present disclosure.

A motor in the apparatus 10 may be configured to convert kinetic energy from the rotation of a cage around the cage axis (e.g., cage axis 102) to electric energy. The motor may also be configured to convert kinetic energy from the rotation of a turbine/blade (e.g., one or more of the turbines 162, 164, 166, 168, 170, 172) around the respective turbine axis to electric energy.

The three major parameters that can be controlled according to the present disclosure include movement relative to a respective cage axis, movement relative to a respective turbine/blade axis, and control of the shape of each blade. There exist at least two modes for transportation, such as a flight mode and a glide mode. In some configurations of the flight mode, each cage may move freely about its own axis, movement about each turbine/blade axis may be controlled according to its position with respect to a rotational path 180 of the cage, wind conditions, and/or the shape of each turbine/blade, which may be dynamically adapted to provide a controlled optimum lift at all times. In some configurations of the glide mode, movement with respect to the respective cage axis, movement with respect to the turbine/blade axis may be restricted, and the shape of each blade may be held fixed. There may also exist two modes for electric generation, such as a first turbine mode and a second turbine mode. In some configurations of the first turbine mode, movement with respect to the respective cage axis may be restricted, the turbine/blade may move freely with respect to its respective axis, and the shape of the blade may be held fixed. In some configurations of the second turbine mode, movement of the cage may be allowed, movement of the turbine/blade may be controlled according to its position with the rotational path 180 of the cage, and the shape of the turbine/blade may be dynamically adapted to provide a controlled optimum lift at all times.

Figure 1B:
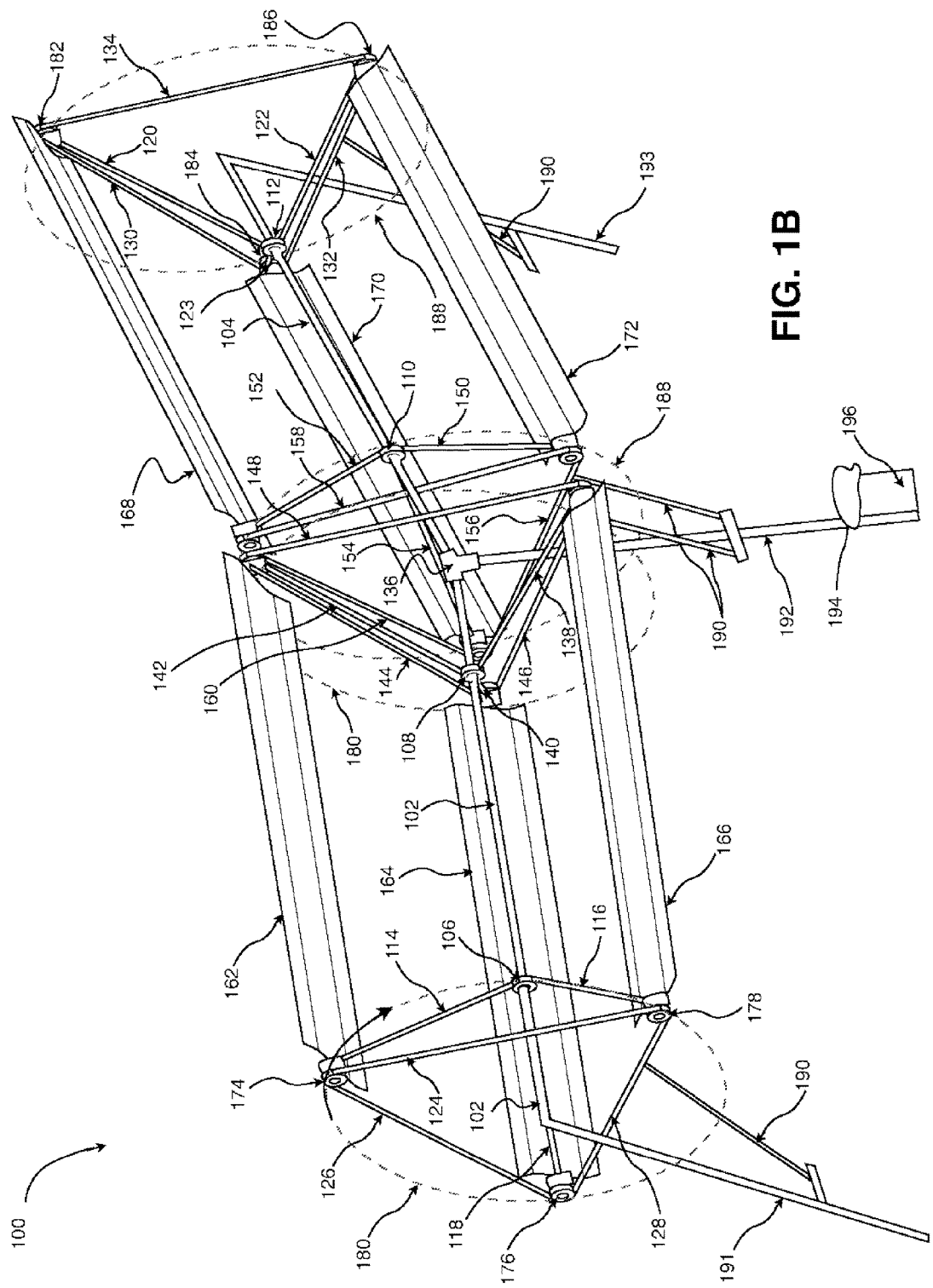
FIG. 1B is a diagram illustrating a side perspective view of an example of a double-cage apparatus according to various embodiments of the present disclosure.

FIG. 1B is a diagram illustrating an example of a double cage apparatus 100 according to various embodiments of the present disclosure. The apparatus 100 illustrated in FIG. 1B includes two cages. A first cage rotates around the cage axis 102 along the circular path 180. A second cage rotates around the cage axis 104 along the circular path 188. The cage axes 102, 104 may be connected together at connection 136 with a wide angle. The connection 136 may route control signals (e.g., user controls) and electric power to an appropriate cage axis. Although two cages are illustrated in the example apparatus 100 shown in FIG. 1B, one of ordinary skill will understand that the scope of the present disclosure is not limited by the number of cages illustrated in FIG. 1B. For example, the apparatus 100 may include an electrical vehicle, (e.g. a bicycle, a boat, etc.), a propeller, a greater number of cages, and/or a fewer number of cages without deviating from the scope of the present disclosure. Similar to the first cage, as shown the second cage also includes belt portion 158, 160, 156 and 130, 132, 134 that may be involved with the rotation of the cage around the cage axis 104 and an arm 193. Each belt portion may make contact with two of the end regions 182, 184, 186 of the turbines of the second cage. As shown, turbines of the second cage are supported by arms 150, 152, 154, on one side and by arms 120, 122, 123, on the other side connected by the connection points 110 and 112, respectively, which extend from the cage axis 104.

In some embodiments, the apparatus 100 may be, in part or in whole, referred to as a Savonius turbine. Blades of the turbines extend more horizontally than vertically relative to ground. For example, the cage axis 102, 104 and the turbine axis of one or more of the turbines 162, 164, 166, 168, 170, 172 extend more in a horizontal direction (i.e., a direction substantially parallel to the ground) than in a vertical direction (i.e., a direction substantially perpendicular to the ground) in order to provide further stability to the apparatus 100 during, for example, the second turbine mode.

The apparatus 100 may include any number of cages and/or any number of turbines without deviating from the scope of the present disclosure, as described above. Accordingly, in some embodiments, the apparatus 100 may include a plurality of cages. The exact number of cages may be based on the lift needed to lift the apparatus 100 and a load above the ground. Also, the exact number of turbines may be based on the size of the cage.

In some embodiments, the apparatus 100 may be, in part or in whole, referred to as a Savonius turbine. Blades of the turbine extend more horizontally than vertically relative to ground. For example, the cage axis 102, 104 and the turbine axis of one or more of the turbines 162, 164, 166, 168, 170, 172 extend more in a horizontal direction (i.e., a direction substantially parallel to the ground) than in a vertical direction (i.e., a direction substantially perpendicular to the ground).

The apparatus 100 may include a seat 194 and user controls near the seat 194. The user controls may be configured for use by a user seated on the seat 194. The user controls may be configured to control the cage controller and/or the turbine controller. For example, a user may use user controls while seated in the seat 194, and the user controls may send control signals through leg 192. Control signals destined for the cages and/or turbines reach their respective destinations. The apparatus 100 may include a power generator 196. Although the example apparatus 100 illustrated in FIG. 1B shows the power generator 196 located underneath the seat 194, one of ordinary skill in the art will understand that the power generator 196 and/or user controls may be located in other portions of the apparatus 100, or even separate from the apparatus 100, without deviating from the scope of the present disclosure.

The apparatus 100 may include motors. A motor 400 of the apparatus 100 may be configured to convert kinetic energy from the rotation of a cage around the cage axis (e.g., cage axis 102, 104) to electric energy. The motor 400 may be configured to convert kinetic energy from the rotation of a turbine (e.g., one or more of the turbines 162, 164, 166, 168, 170, 172) around the respective turbine axis to electric energy. The motor 400 may be configured to turn a cage and/or the Savonius turbine/blade.

Figure 2:
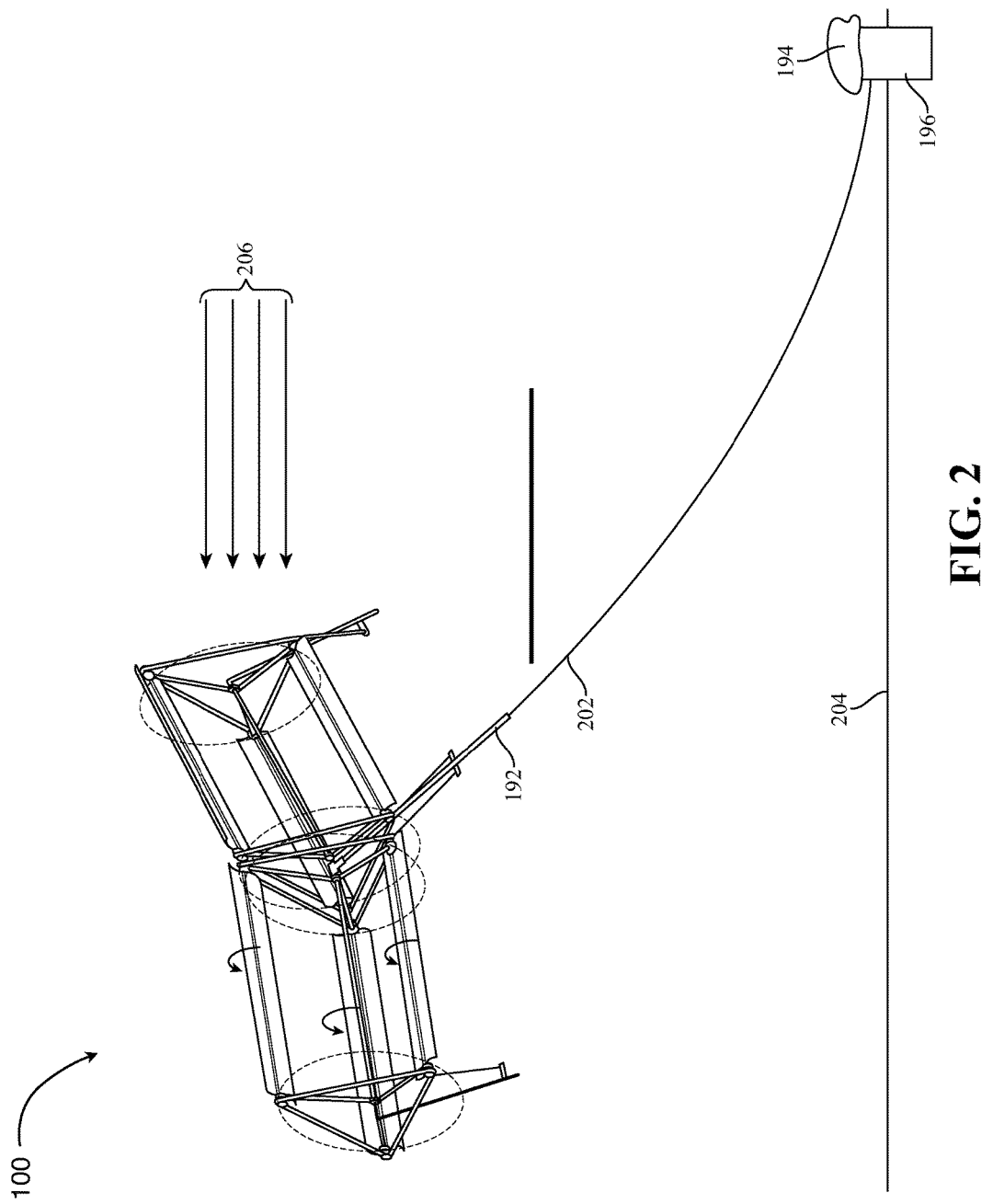
FIG. 2 is a diagram illustrating a side perspective view of another example of an apparatus according to various embodiments of the present disclosure.

FIG. 2 is a diagram illustrating another example of the apparatus 100. In the example illustrated in FIG. 2, the apparatus 100 is connected by a connecting element 202 to ground 204. The connecting element 202 may be a rope, a conducting wire, a plastic, a metal, any combination thereof, and/or any other suitable element. For example, the connecting element 202 may connect the leg 192 of the apparatus 100 to the power generator/storage 196 and/or seat 194, which may be connected to the ground 204.

As illustrated in FIG. 2, wind 206 traveling in the air may cause the turbine blades of the apparatus 100 to turn (e.g., rotate relative to the respective turbine axis). As also illustrated in FIG. 2, wind 206 traveling in the air may cause the cage(s) of the apparatus to turn (e.g., rotate relative to the respective cage axis). The turning (e.g., rotation) of cages and/or turbines/blades may induce the Magnus effect and, thereby, cause the apparatus 100 to lift above the ground 204, as described in greater detail above.

One of ordinary skill in the art will appreciate that the turning of each cage and the turning of each turbine may be controlled individually based on various factors. For example, such control may be used for purposes of steering and navigation (e.g., turning left and/or turning right). As another example, such control may be used for purposes of ascent and/or descent (e.g., going up in elevation and/or going down in elevation). Such control may also be used for maintaining substantially still in the air, going forward or going backward, (e.g., adjusting the cage and/or turbines such that the apparatus 100 remains substantially still, going forward or going backward, during changing wind conditions).

FIG. 3A is a diagram illustrating a side view of the apparatus 10, 100. Specifically, the side view is down the axis of rotation of the cage(s) of the apparatus 10, 100. In FIG. 3A, a vertical axis 310 and a horizontal axis 312 are shown for illustrative purposes. The cage(s) of the apparatus 10, 100 may rotate along the rotational path 180. The belt may include the belt portions 124, 126, 128, as described in greater detail above. The turbines 162, 164, 166 may rotate in the areas 302, 304, 306 illustrated in FIG. 3A.

FIG. 3B is a diagram illustrating another side view of the apparatus 10, 100. Specifically, the side view is down the axis of rotation of one of the turbine(s) of the apparatus 10, 100 (e.g., down the axis of rotation of turbine 162 illustrated in FIGS. 1A and 3A). The turbine (e.g., turbine 162 illustrated in FIG. 3B) may rotate along the rotational path 302. The end portions of the turbine(s) (e.g., end path 174) may relate to a line 314, wherein the line 314 rotates along the area 302.

Figure 4:
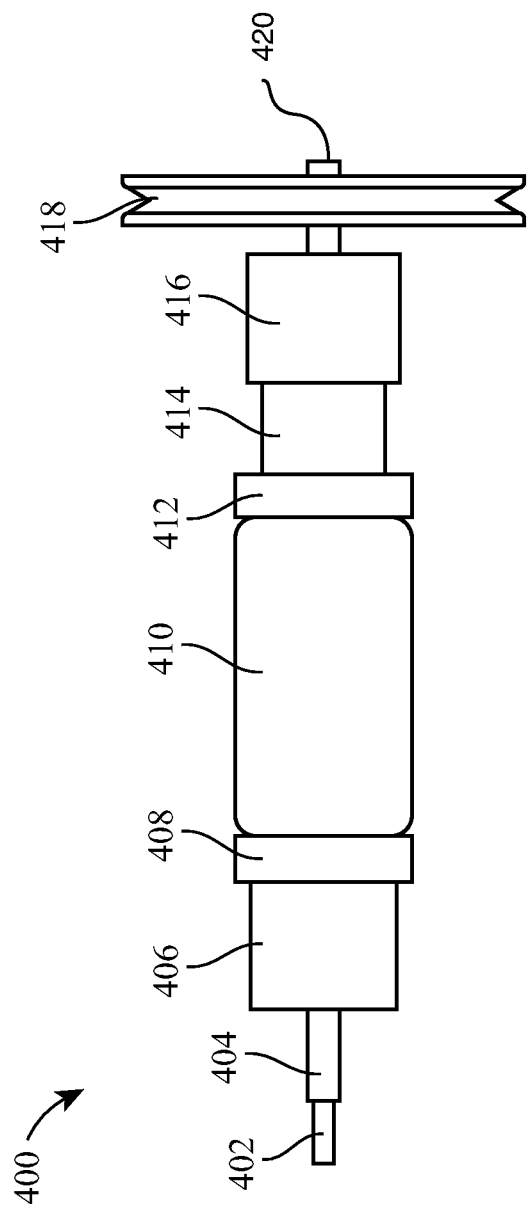
FIG. 4 is a diagram illustrating a side perspective view of an example of various motor components of an apparatus according to various embodiments of the present disclosure.

FIG. 4 is a diagram illustrating a side perspective view of an example of various motor components 400 of the apparatus 10, 100. One of ordinary skill in the art will understand that the example illustrated in FIG. 4 is provided for illustrative purposes only and alternative and/or additional components may be included (or excluded) without deviating from the scope of the present disclosure. The apparatus 10, 100 may have fewer modes if any one or more components are excluded from the motor 400. In the non-limiting example illustrated in FIG. 4, the motor components 400 may include a control power supply shaft 402, a turbine shaft 404, a first gear box 406, a first clutch 408, an electric motor/generator 410, a second clutch 412, a lock 414, a second gear box 416, a cage pulley 418, and/or a cage pulley shaft 420. In some embodiments, such motor components 400 may be located in the end regions (e.g., end regions 174, 176, 178, 173, 175, 177) of the turbines (e.g., turbines 162, 164, 166). However, one of ordinary skill in the art will understand that such motor components 400 may be located in any other portion of the apparatus 100 without deviating from the scope of the present disclosure.

Figure 5:
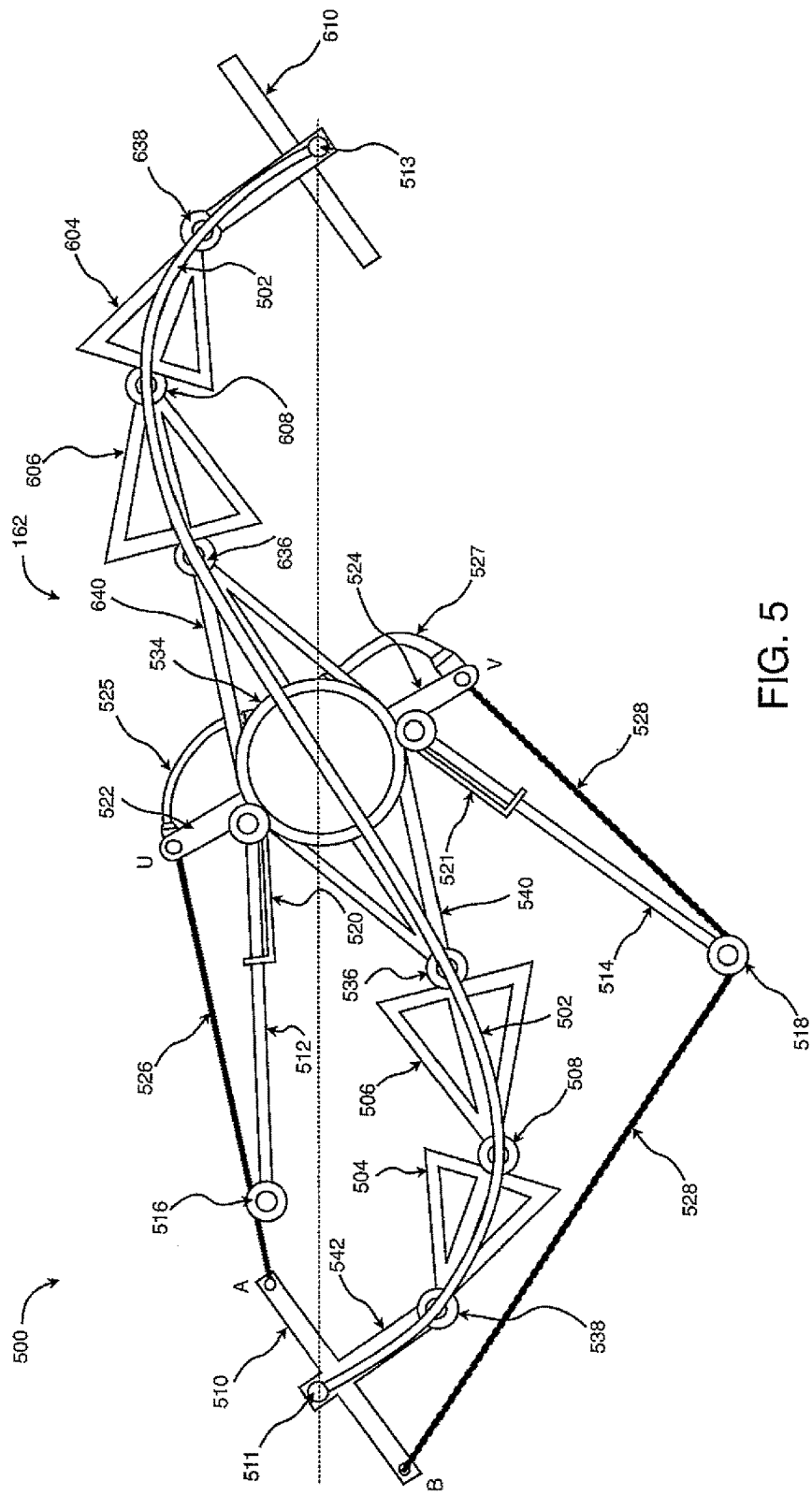
FIG. 5 is a diagram illustrating a cross-sectional side view of a portion of an example turbine of an apparatus according to various embodiments of the present disclosure.

FIG. 5 is a diagram illustrating a cross-sectional side view of a portion of an example turbine 500 of the apparatus 10, 100. As described above, the turbine 500 may have a turbine blade 502 having an adaptable shape. The shape of the turbine blade 502 may be adapted based on various factors, as described in greater detail below. The turbine blade 502 may include a flexible material, may be connected, adhered, coupled, attached, latched, and/or otherwise associated with the frame of the turbine blade 502 at various locations. The frame of the turbine 500 may include one or more portions. For example, the frame of the turbine 500 may include a first frame portion 506 and a second frame portion 504. The first frame portion 506 may be coupled to the second frame portion 504. For example, the first frame portion 506 may be connected to the second frame portion 504 at the pivot point 508. The first frame portion 506 may be configured to pivot relative to the second frame portion 504. Such pivoting allows the frame to affect the shape of the turbine blade 502 and, thus, the overall turbine 500. One of ordinary skill in the art will understand that the example illustrated in FIG. 5 is provided for illustrative purposes only and alternative and/or additional components may be included (or excluded) without deviating from the scope of the present disclosure.

The turbine 500 may also have other components without deviating from the scope of the present disclosure. For example, the first frame portion 506 may be connected to another frame portion 540 at another pivot point 536. Frame portion 540 may be fixedly attached to the core 534. As another example, the second frame portion 504 may be connected to yet another frame portion 542 at yet another pivot point 538. The frame of the turbine blade 500 may include additional, alternative, or fewer components without deviating from the scope of the present disclosure. The size of each frame portion may be different from the other frame portions and may be arranged in such a way so as to be able to configure one side of the blade as a front wing/blade in a glide mode and the other side may be configured as a tail of the wing/blade. The number of frame portions of one side may be different from the number of frame portions of the other side of the turbine blade.

The turbine 500 may also include various connections between an end of the frame of the turbine and a center region of the frame of the turbine. For example, the turbine 500 may include a first connection (e.g., a connection including cable 526 and arm 522) between a first side (e.g., A) of a first end (e.g., end 510) that is fixed to the frame portion 542 and a center region (e.g., location U near core 534). The turbine 500 may also include a second connection (e.g., a connection including cable 528 and arm 524) between a second side (e.g., B) of the first end (e.g., end 510) of the frame portion 542 and the center region (e.g., location V near core 534). As described above, the apparatus 100 may include a turbine controller. The turbine controller may be configured to control the first connection and/or the second connection. For example, the turbine controller may be configured to at least maintain, shorten, or lengthen at least the first connection or the second connection. The turbine controller may be configured to perform additional functions (e.g., control other connections) without deviating from the scope of the present disclosure. The end 510 is fixed to the frame portion 542 however it may be fixed to any other portion(s) of the frame. Movement of each frame portion may also be separately controlled.

In some embodiments, the apparatus 100 may also include arms located on the sides of the frame of the turbine 500. For example, the arms 512, 514 may be located on the sides of the frame portions 504, 506. Such arms may provide mechanical support and facilitate in the movement of the cables described above. In some embodiments, each arm may also have a roller at the end of the arm. For example, the arms 512, 514 may have rollers 516, 518, respectively. The cables 526, 528 may roll on the roller 516, 518. The arms 512, 514 may also have springs 520, 521, respectively. The springs may provide a force onto the arms such that the arms 512, 514 are pushed in a direction that is away from the frame and or turbine blade 502. The foregoing are merely some examples of supporting the cables 526, 528. One of ordinary skill in the art will understand that various other examples of supporting the cables 526, 528 exist and may be implemented without deviating from the scope of the present disclosure.

The cables 526, 528 may each be lengthened and/or shortened. For example, cable 526 may be shortened such that A is closer to U. As another example, cable 528 may be lengthened such that B is farther from V. Such shortening(s) and/or lengthening(s) allow the frame portions 504, 506, 542, 540 to pivot relative to each other (e.g., a pivot point 508, 538, 536), thereby allowing the turbine blade 502 to have a curved shape. The curvature of the turbine blade 502 may be controlled by the extent to which the first connection (e.g., the connection including cable 526) is shortened and lengthened and the extent to which the second connection (e.g., the connection including cable 528) is lengthened or shortened, respectively.

As described above, the first frame portion 506 is configured to pivot (e.g., at pivot point 508) relative to the second frame portion 504 when the first connection (e.g., the connection including cable 526) and/or the second connection (e.g., the connection including cable 528) is shortened and/or lengthened. Accordingly, the adaptable shape of the turbine blade 502 includes a curvature when the length of the first connection (e.g., the connection including cable 526) is different from the length of the second connection (e.g., the connection including cable 528). In comparison, the adaptable shape of the turbine blade 502 has a flat shape when the length of the first connection (e.g., the connection including cable 526) is similar to the length of the second connection (e.g., the connection including cable 528). The turbine controller may be configured to control the curvature of the turbine blade 502 by shortening the first connection (e.g., the connection including cable 526) while concurrently lengthening the second connection (e.g., the connection including cable 528). The turbine controller may also be configured to control the curvature of the turbine blade 502 by shortening the second connection (e.g., the connection including cable 528) while concurrently lengthening the first connection (e.g., the connection including cable 526).

Figure 6C:
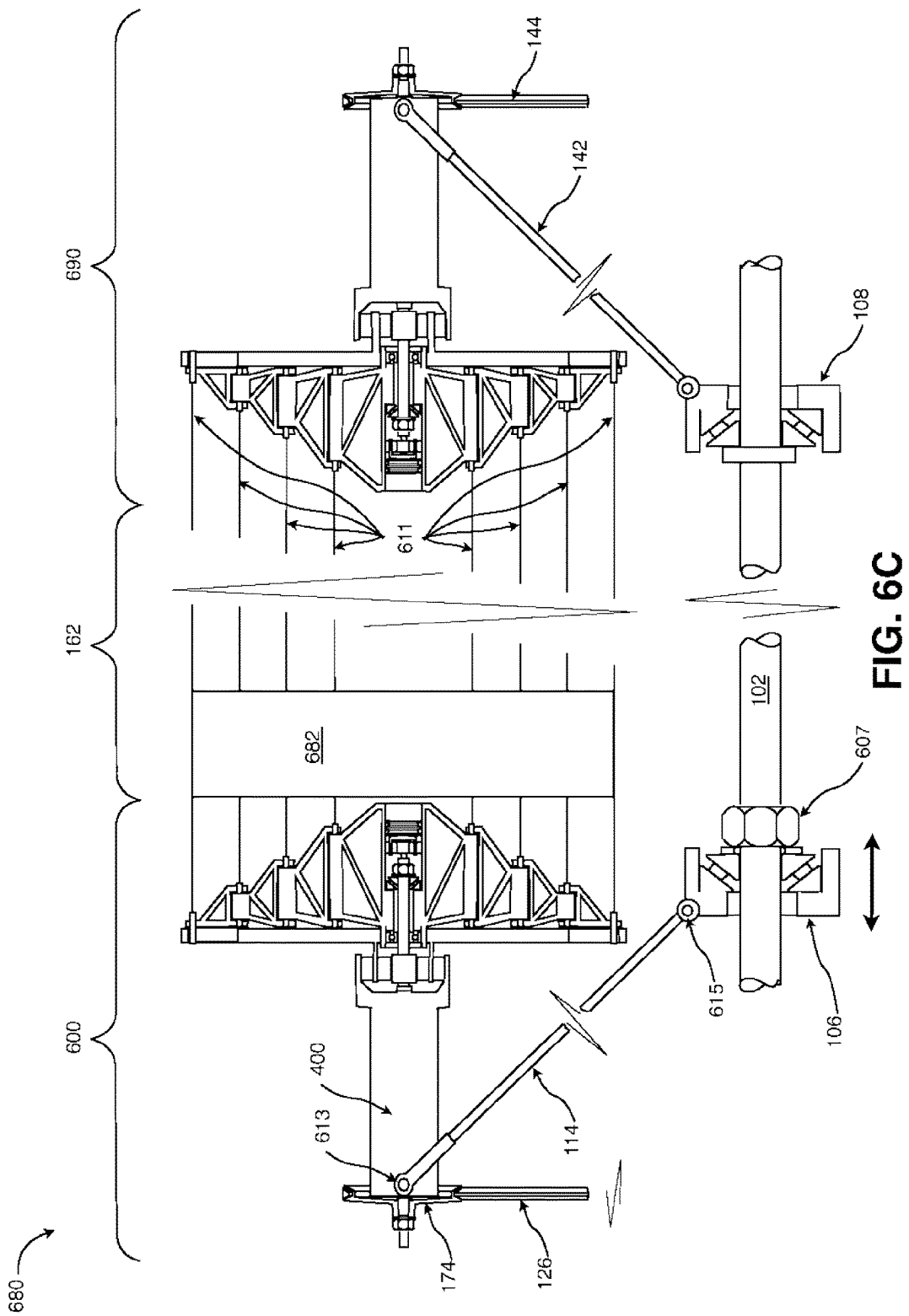

FIGS. 6A-6C are diagrams illustrating various cross-sectional views of various portions of an example turbine 680 of the apparatus 100. As described in greater detail above, the apparatus 100 may include motor components 400. As also described in greater detail above, the apparatus may include arms 114, 142. Arm 114 has two connection points 613 and 615. The turbine 680 may also include a bracket 652. The bracket 652 may include regions 654, wherein the pins 511, 513 may slide, and body 653. For example, as the turbine blade changes the curvature of its shape, the pins 511, 513 may slide toward and/or away from the core 534. Some other portions of the turbine illustrated in FIG. 6 are described above with reference to FIG. 5. For example, frame portions 640, 606, 604, 642 and pivot points 636, 608, 638 are similar to the frame portions 540, 506, 504, 542 and the pivot points 536, 508, 538, respectively. Planetary gear 671 may be located near the core 534. Hole 804 is for inserting pin 511 into the bracket. The planetary gear 671 may transmit the kinetic energy generated from the movement of blades to a motor generator that may be located at the end regions, as described in greater detail above. A portion of the turbine 680 may include tension cables/belt providing mechanical support and/or rigidity to the flexible material/sheet 682 of the turbine 680. One of ordinary skill in the art will understand that the flexible sheet 682 may include or be formed from of a wide variety of material, which may include various materials ranging from cloth to metal sheets, as well as various other suitable materials. The nut 607 may be used to tighten or loosen the tension of cables 611 and/or the blade(s) 162 and the cage belts as well. For example, when the distance between the connectors 106 and 108 increase, the tension cables/belts and the cage belts will tighten. When this distance decreases, the cage belts and/or the blade(s) 162 including the tension cables/belts will loosen. The tension of the tension cables/belts may be separately adjusted. The portion 690 of the turbine 680 may be similar to another portion 600 of the turbine 680. The turbine 680 may also include a control gearbox 650. One of ordinary skill in the art will understand that the foregoing is merely one example of achieving the features described herein. Alternative configurations and systems may be implemented without deviating from the scope of the present disclosure. Additional information about the control gearbox 650 is provided below, inter alia, with reference to FIGS. 7A-7B.

Similar portions of the turbine may have complementary aspects. For instance, one half of the turbine frame 670 (and therefore the turbine blade 682) may form a convex-like shape while another half of the turbine frame 670 (and therefore the turbine blade 682) may form a concave-like shape. For example, one half of the turbine frame may form a first shape (e.g. a convex-like shape) when (i) a connection (e.g., a cable) between A and U is shortened and/or (ii) a connection (e.g., a cable) between B and V is lengthened; concurrently, another half of the turbine frame may form a (complementary) second shape (e.g. a concave-like shape) when (i) a connection (e.g., a cable) between C and V is shortened and/or (ii) a connection (e.g., a cable) between D and U is lengthened. As such, a configuration of the frame portions 540, 506, 504, 542 and the pivot points 536, 508, 538 forming a convex-like shape for one half of the turbine blade 682 may exist concurrently with a configuration of the frame portions 640, 606, 604, 642 and the pivot points, 636, 608, 638 forming a concave-like shape for another half of the turbine blade 682.

FIGS. 7A-7B are diagrams illustrating various cross-sectional views of various portions of example blade controllers of the apparatus 100. As described above, the apparatus 100 may include a control gearbox 650. The control gearbox 650 may include a quadrate pulley 702. The quadrate pulley 702 may operate in accordance with one or more pulleys or cable pipes 525, 527, 727, 729. However, one of ordinary skill in the art will understand that pulleys and/or cable pipes are not the only mechanism of shortening and/or lengthening various connections of the apparatus. Alternative mechanisms for shortening and/or lengthening connections exist and are within the scope of the present disclosure. The quadrate pulley 702 may be configured to shorten one (or more) connection(s) while concurrently lengthening one (or more) connection(s). For example, the quadrate pulley 702 may be configured to shorten one or more of the connections including cable 528 and/or cable 728 while concurrently lengthening one or more of the connections including cable 526 and/or cable 726. As such, the connection including cable 528 toward B may be shortened and/or the connection including cable 728 toward D may be shortened. Also, the connection including cable 526 toward A may be lengthened and/or the connection including cable 726 toward C may be lengthened. The nut 705 and ball 707 may prevent the central core from separating from the turbine shaft. The shaft 402 may have a bearing that is considered on the cap that covers the pulley.

Figure 8:
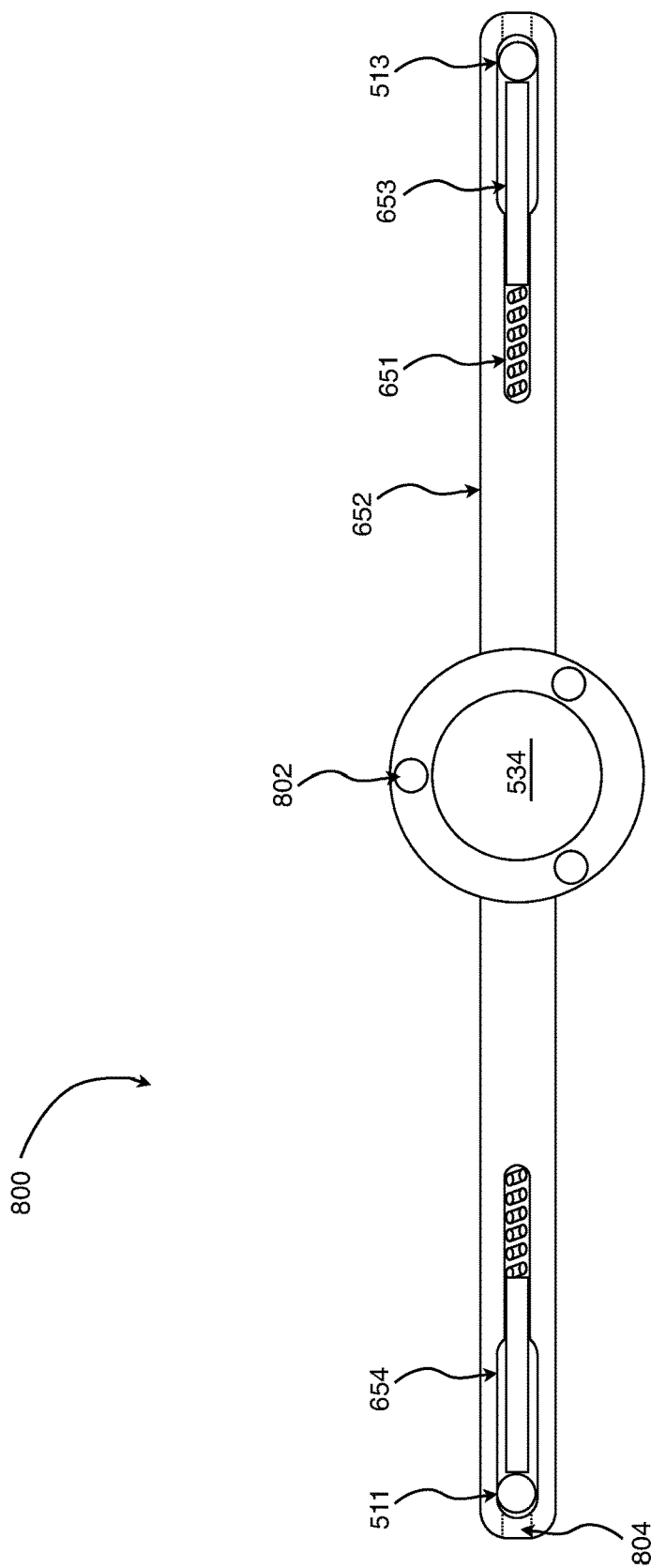
FIG. 8 is a diagram illustrating an example of a bracket according to various embodiments of the present disclosure.

FIG. 8 is a diagram illustrating an example of a bracket according to various embodiments of the present disclosure. The bracket 652 may receive the kinetic energy of the blade (e.g., via pins 511, 513) and transfer the kinetic energy to the respective turbine shaft through the shaft(s) 802 of the planet gear(s) of a planetary gear set 671. The bracket may have spring(s) 651, which may push pins 511, 513 away from each other as long as connection cables 526, 528, 726, 728 allow the pins 511, 513 to slide in the regions 654 and 653 apart from each other.

Figure 9:
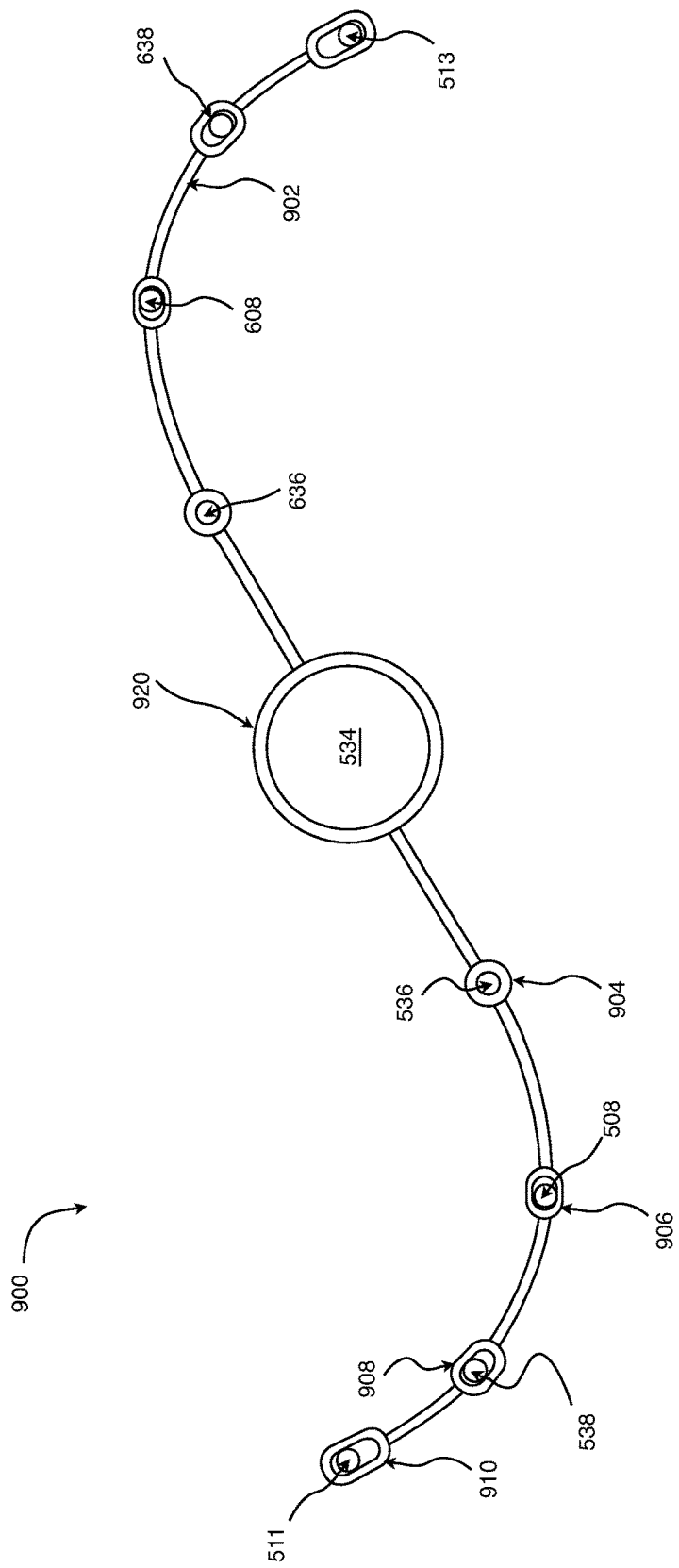
FIG. 9 is a diagram illustrating an example of a pivots distributor spring according to various embodiments of the present disclosure.

FIG. 9 is a diagram illustrating an example of a pivots distributor spring according to various embodiments of the present disclosure. When the sheet 682 is not flexible and is made of non-flexible materials (e.g., cloth), then each turbine may need one or more pivot distributor springs 900 at each side. The shape of pivots distributor spring 900 may change when one or more of the connection cables 526, 528, 726, 728 are shortening or lengthening. The shape of the spring may be shaped like the letter "S" when the stated connection cables are not equal. The shape of the spring may be shaped as substantially straight when the stated connection cables have similar lengths. The pivots distributor spring 900 may have ring 920 around the central core 534 and the pivot rings 904, 906, 908 may move together with pivots 536, 508, 538, respectively, which may restrict movement of pivot(s) to the shape of the pivots distributor spring 900. Such a configuration may be installed immediately after the bracket and/or next to the blade frame portions, or any other location near the blade ends. Pin 511 can move inside a ring 910.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus with rotating turbines comprising:
a cage rotating around a cage axis, wherein the rotation of the cage around the cage axis induces a lift of the apparatus above a ground; and
a plurality of turbines located within the cage, wherein each of the plurality of turbines is configured by two end points to fully rotate in a 360-degree circular path around a respective turbine axis different from the cage axis, and wherein each of the plurality of turbines comprises
a turbine blade having an adaptable shape;
a frame including a first frame portion and a second frame portion coupled to the first frame portion, and wherein the first frame portion pivots relative to the second frame portion; and
a first connection between an end of the frame and a region of the frame away from the end of the frame, wherein a length of the first connection is configured to change,
and wherein
changing the length of the first connection causes the adaptable shape of the turbine blade to conform to a flat shape and a curved shape.

2. The apparatus of claim 1, wherein the first frame portion pivots relative to the second frame portion when the length of the first connection is shortened or lengthened.

3. The apparatus of claim 1, further comprising a second connection between the end of the frame and the region of the frame away from the end of the frame.

4. The apparatus of claim 3, wherein the adaptable shape of the turbine blade comprises the flat shape when the length of the first connection is the same as a length of the second connection, and the curved shape when the length of the first connection is different from the length of the second connection.

5. The apparatus of claim 3, wherein shortening the first connection while concurrently lengthening the second connection or shortening the second connection while concurrently lengthening the first connection forms the curved shape.

6. The apparatus of claim 1, wherein the frame further comprises a third frame portion that pivots relative to the second frame portion.

7. The apparatus of claim 1, wherein each of the plurality of turbines is a Savonius turbine, and wherein each blade of the Savonius turbines extend horizontally relative to the ground.

8. The apparatus of claim 1, further comprising a seat and user controls in proximity of the seat.

9. The apparatus of claim 1, wherein a rotation of the cage around the cage axis is inhibited when the apparatus is in a first mode, and wherein a rotation of each of the plurality of turbines around the respective turbine axis is allowed when the apparatus is in the first mode.

10. The apparatus of claim 1, wherein a rotation of the cage around the cage axis is allowed when the apparatus is in a second mode, and wherein a rotation of each of the plurality of turbines around the respective turbine axis is allowed when the apparatus is in the second mode.

11. The apparatus of claim 1, wherein a rotation of the cage around the cage axis is inhibited when the apparatus is in a third mode, and wherein the turbine blade remains in a horizontal position relative to the ground and a rotation of each of the plurality of turbines around the respective turbine axis is inhibited when the apparatus is in the third mode.

12. The apparatus of claim 1, wherein a rotation of each of the plurality of turbines around the respective turbine axis lifts the apparatus above the ground.

13. The apparatus of claim 1, further comprising a motor to convert a kinetic energy from the rotation of the cage around the cage axis to electric energy or to convert a kinetic energy from the rotation of each of the plurality of turbines around the respective turbine axis to electric energy.

14. The apparatus of claim 1 further comprising a seat to accommodate a user, wherein the adaptive shape of the turbine blades is responsive to inputs from the user.

15. An apparatus comprising:
a cage that rotates around a cage axis, wherein the rotation of the cage around the cage axis induces a lift of the apparatus above a ground;

a plurality of turbines located within the cage, wherein each of the plurality of turbines is configured by two end points to fully rotate in a 360-degree circular path around a respective turbine axis different from the cage axis, and wherein each of the plurality of turbines comprises a turbine blade having an adaptable shape, and a first connection between a first end of said each of the plurality of turbines and a center region of said each of the plurality of turbines turbine, wherein a length of the first connection is configured to change, and wherein adjusting the length of the first connection causes the adaptable shape of the turbine blade to change to a flat or curved shape.

16. The apparatus of claim 15, wherein each of the turbine blades comprises a frame having a first frame portion and a second frame portion coupled to the first frame portion, and wherein the first frame portion pivots relative to the second frame portion when the connection is shortened or lengthened.

17. The apparatus of claim 15, wherein a rotation of the cage around the cage axis is inhibited when the apparatus is in a first mode, and wherein a rotation of each of the plurality of turbines around the respective turbine axis is allowed when the apparatus is in the first mode.

18. The apparatus of claim 15, wherein a rotation of the cage around the cage axis is inhibited when the apparatus is in a second mode, and wherein a rotation of each of the plurality of turbines around the respective turbine axis is inhibited when the apparatus is in the second mode.

* * * * *